(12) United States Patent
Boldyrev et al.

(10) Patent No.: US 9,059,942 B2
(45) Date of Patent: Jun. 16, 2015

(54) METHOD AND APPARATUS FOR PROVIDING AN ARCHITECTURE FOR DELIVERING MIXED REALITY CONTENT

(71) Applicant: Nokia Technologies Oy, Espoo (FI)

(72) Inventors: Sergey Boldyrev, Söderkulla (FI); Jari-Jukka Harald Kaaja, Järvenpää (FI); Mikko Aleksi Uusitalo, Helsinki (FI); David Joseph Murphy, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 193 days.

(21) Appl. No.: 13/733,614

(22) Filed: Jan. 3, 2013

(65) Prior Publication Data

US 2013/0179576 A1 Jul. 11, 2013

Related U.S. Application Data

(60) Provisional application No. 61/584,581, filed on Jan. 9, 2012.

(51) Int. Cl.
*G06F 15/173* (2006.01)
*H04L 12/911* (2013.01)
*H04L 29/08* (2006.01)
*H04L 29/06* (2006.01)

(52) U.S. Cl.
CPC ............ *H04L 47/70* (2013.01); *H04L 67/1097* (2013.01); *H04L 67/18* (2013.01); *H04L 67/38* (2013.01)

(58) Field of Classification Search
USPC ........................... 709/226, 203, 200; 345/633
See application file for complete search history.

(56) References Cited

U.S. PATENT DOCUMENTS

2010/0036954 A1 2/2010 Sakata et al.
2010/0274772 A1 10/2010 Samuels
2010/0287485 A1 11/2010 Bertolami et al.

(Continued)

OTHER PUBLICATIONS

Notification of Transmittal of The International Search Report and The Writeen Opinion of The International Searching Authority, or The Declaration for International Application No. PCT/FI2012/051273, dated May 22, 2013, pp. 1-14.
X. Luo, "From Augmented Reality to Augmented Computing: a Look at Cloud-Mobile Convergence", 2009 International Symposium on Ubiquitous Virtual Reality, Jul. 8-11, 2009, pp. 29-32.

(Continued)

*Primary Examiner* — El Hadji Sall
(74) *Attorney, Agent, or Firm* — Alston & Bird LLP

(57) ABSTRACT

An approach is described for providing an architecture for delivering mixed reality content. A mixed reality platform determines one or more requests for one or more digital objects. The one or more digital objects aggregate location-based data, one or more computations, or a combination for supporting at least one mixed reality application. The mixed reality platform also determines one or more densities of the one or more requests with respect to one or more geographical boundaries defined by one or more clusters of the one or more digital objects. The mixed reality platform then processes and/or facilitates a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

20 Claims, 13 Drawing Sheets

(56) References Cited

U.S. PATENT DOCUMENTS

2011/0187744 A1  8/2011  Kim et al.
2012/0001939 A1  1/2012  Sandberg
2012/0092528 A1  4/2012  Jung et al.
2012/0105474 A1  5/2012  Cudalbu et al.
2012/0105475 A1  5/2012  Tseng
2012/0151074 A1* 6/2012  Wood et al. .................. 709/228

OTHER PUBLICATIONS

"Augmented Reality Market: Google Glasses, Cloud Computing & Military Applications Analyzed in New Research Reports", http://www.prnewswire.com/news-releases/augmented-reality-market-google-glasses-cloud-computing--military-applications-analyzed-in-new-research-reports-164406196.html.

* cited by examiner

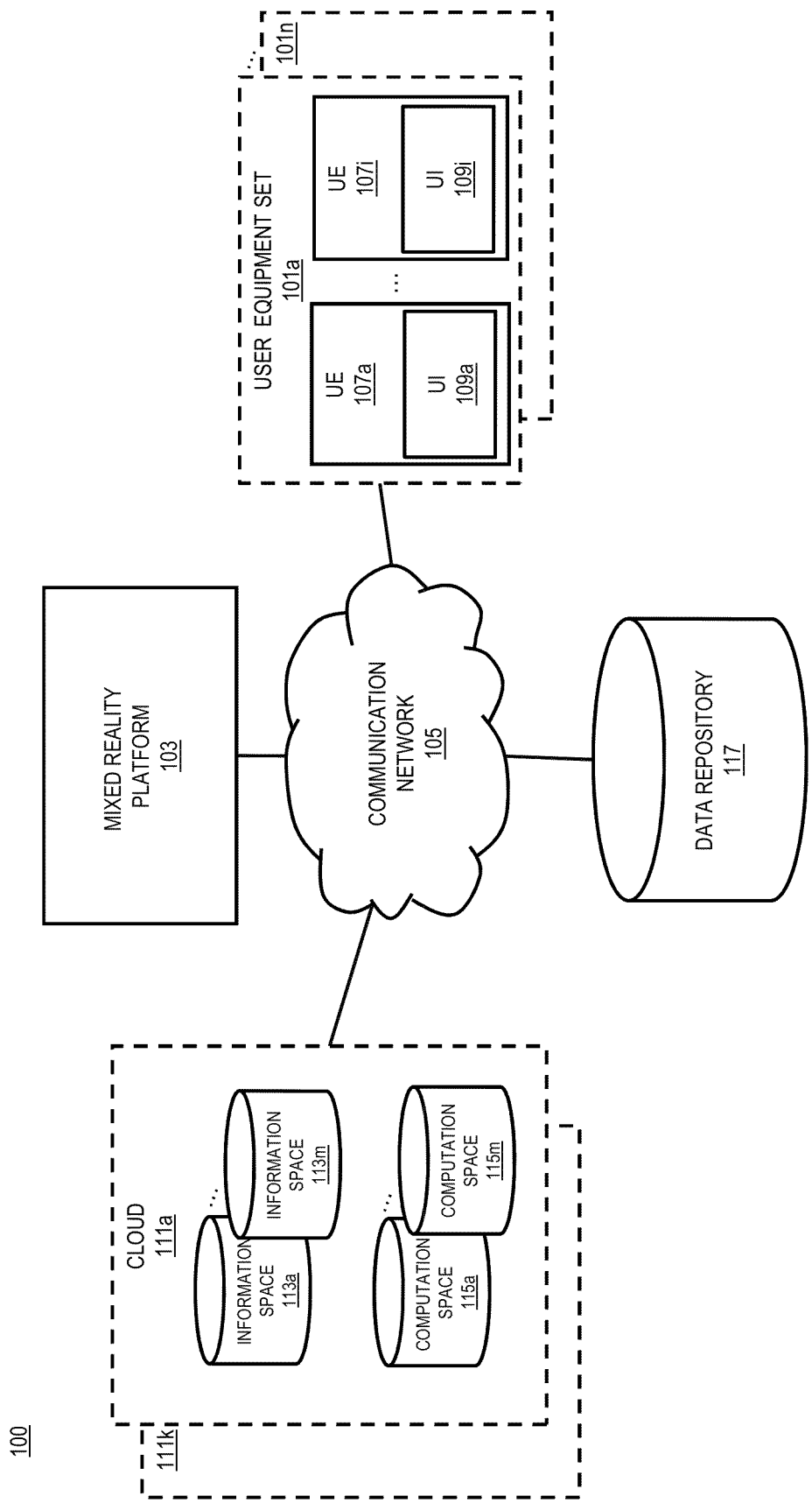

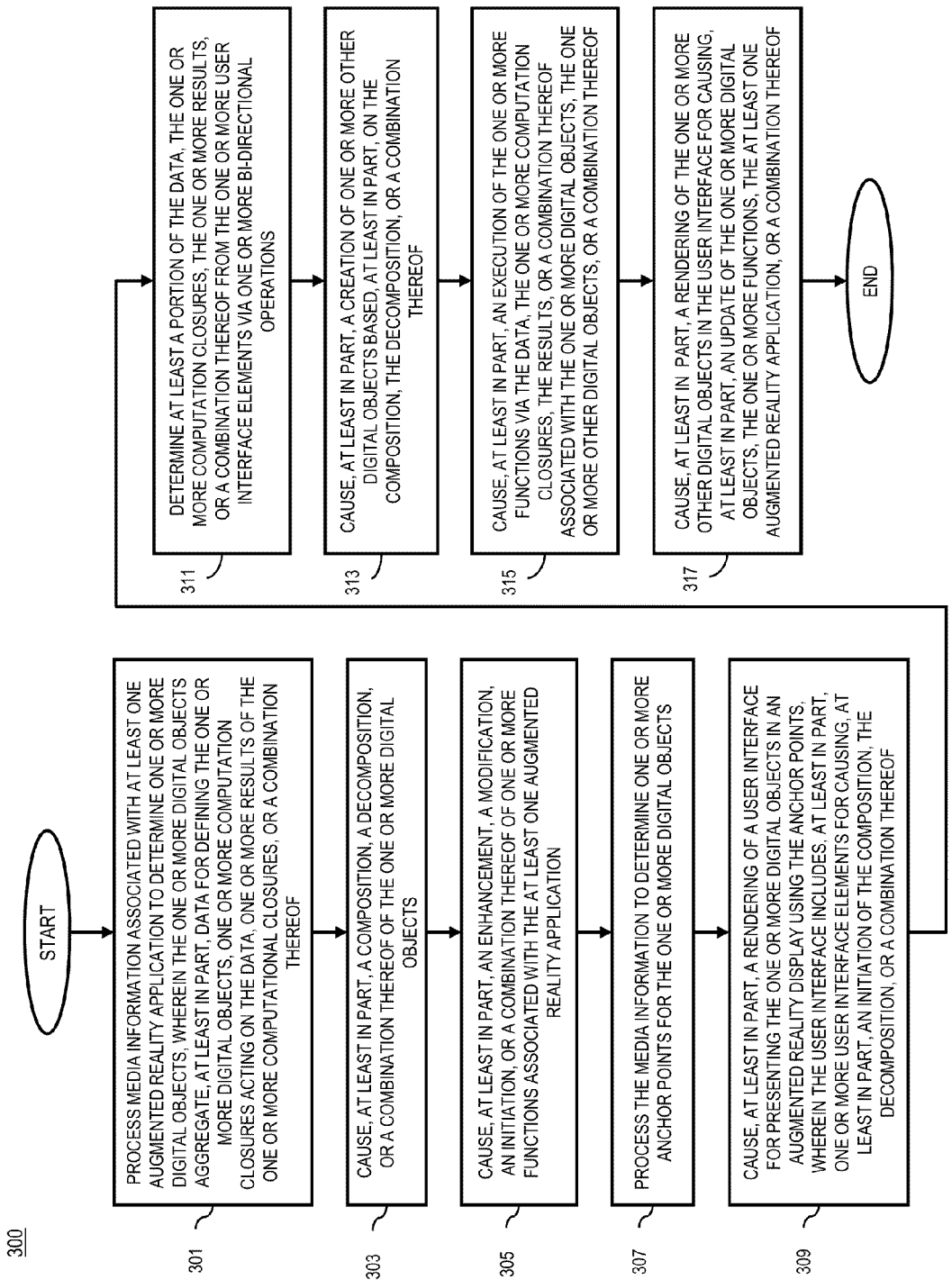

320

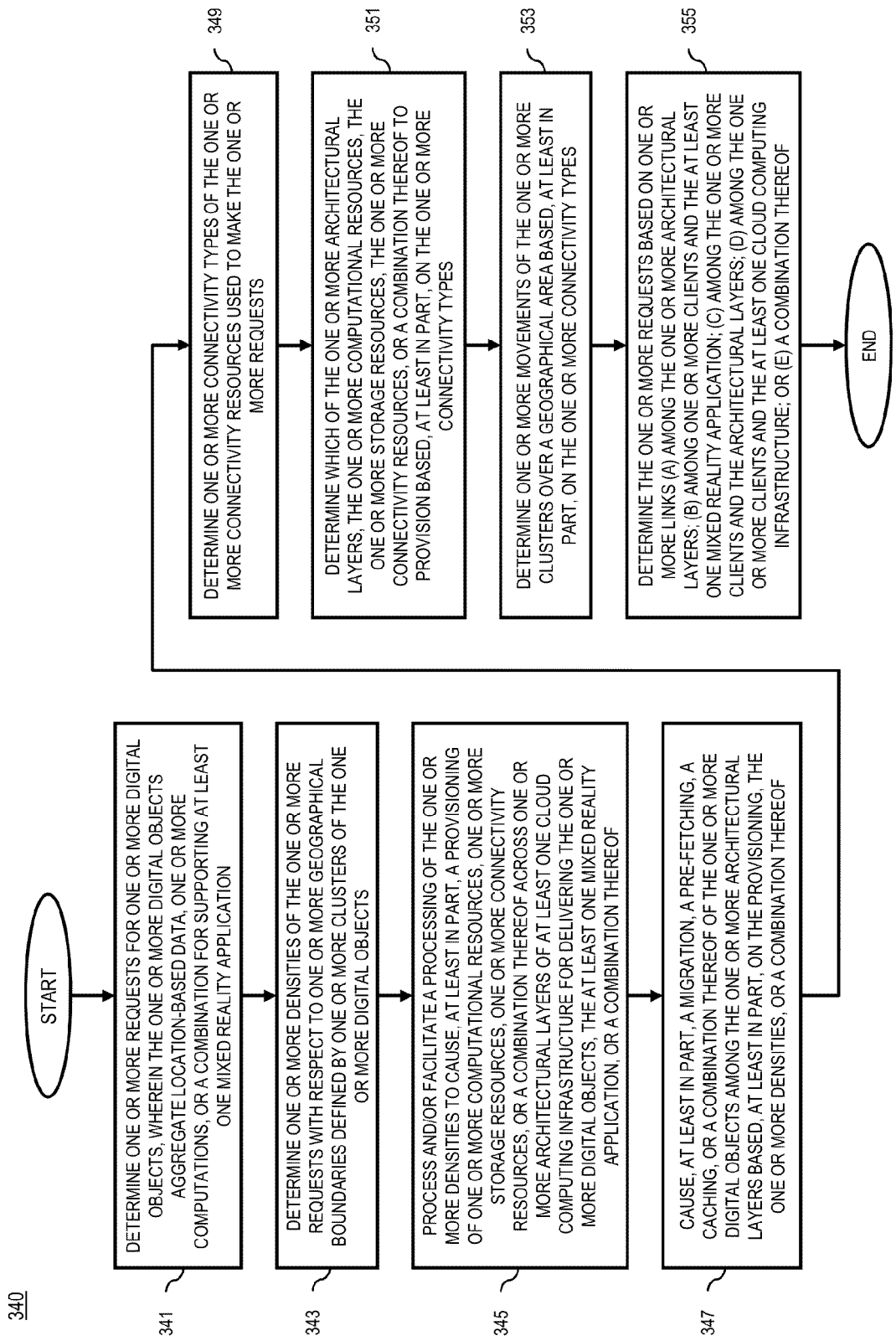

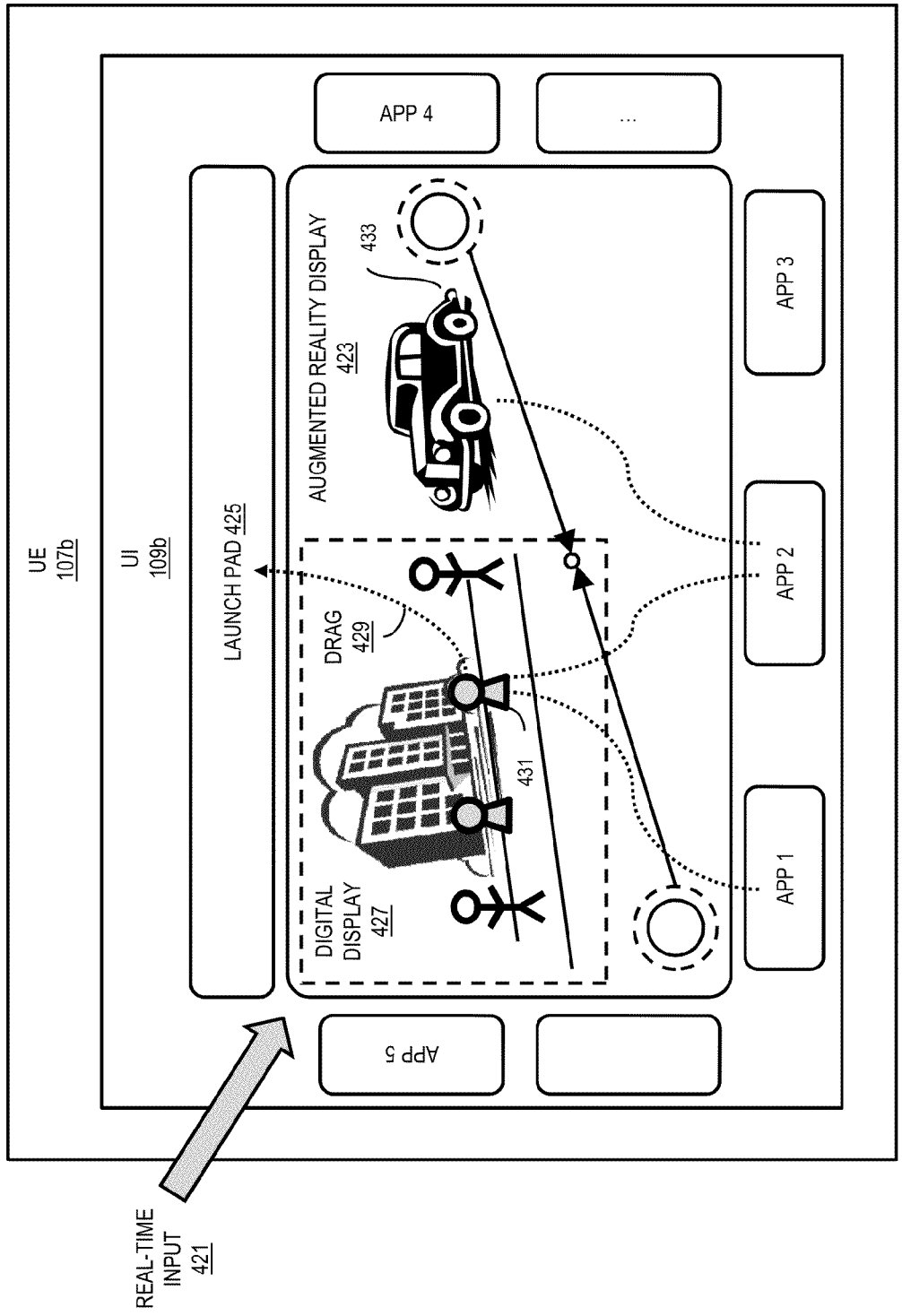

METHOD AND APPARATUS FOR PROVIDING AN ARCHITECTURE FOR DELIVERING MIXED REALITY CONTENT

RELATED APPLICATIONS

This application claims the benefit of the earlier filing date under 35 U.S.C. §119(e) of U.S. Provisional Application Ser. No. 61/584,581 filed Jan. 9, 2012, entitled "Method and Apparatus for Providing an Architecture for Delivering Mixed Reality Content," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, augmented reality applications, etc.) that have greatly increased in popularity, functionality, and content. Augmented reality and mixed reality applications allow users to see a view of the physical world merged with virtual objects in real time. Mapping applications further allow such virtual objects to be annotated to location information. However, with this increase in the available content and functions of these services, service providers and device manufacturers face significant challenges to present the content which is relevant for users and in ways that can be easily and quickly understood by the users while providing for efficient use of available computational resources for servers, clients, and other components associated with providing mixed reality location-based applications. For example, presenting mixed reality content (e.g., three-dimensional data tiles, map tiles, etc.) can be resource intensive, particularly when mixed reality applications are hosted over a cloud computing infrastructure where content is streamed to the user device as needed.

SOME EXAMPLE EMBODIMENTS

Therefore, there is a need for an approach for providing an efficient architecture for delivering mixed reality content.

According to one embodiment, a method comprises determining one or more requests for one or more digital objects. The one or more digital objects aggregate location-based data, one or more computations, or a combination for supporting at least one mixed reality application. The method also comprises determining one or more densities of the one or more requests with respect to one or more geographical boundaries defined by one or more clusters of the one or more digital objects. The method further comprises processing and/or facilitating a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more requests for one or more digital objects. The one or more digital objects aggregate location-based data, one or more computations, or a combination for supporting at least one mixed reality application. The apparatus is also caused to determine one or more densities of the one or more requests with respect to one or more geographical boundaries defined by one or more clusters of the one or more digital objects. The apparatus is further caused to process and/or facilitate a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

According to another embodiment, a computer-readable storage medium carries one or more sequences of one or more instructions which, when executed by one or more processors, cause, at least in part, an apparatus to process and/or facilitate a processing of media information associated with at least one augmented reality application to determine one or more requests for one or more digital objects. The one or more digital objects aggregate location-based data, one or more computations, or a combination for supporting at least one mixed reality application. The apparatus is also caused to determine one or more densities of the one or more requests with respect to one or more geographical boundaries defined by one or more clusters of the one or more digital objects. The apparatus is further caused to process and/or facilitate a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

According to another embodiment, an apparatus comprises means for determining one or more requests for one or more digital objects. The one or more digital objects aggregate location-based data, one or more computations, or a combination for supporting at least one mixed reality application. The apparatus also comprises means for determining one or more densities of the one or more requests with respect to one or more geographical boundaries defined by one or more clusters of the one or more digital objects. The apparatus further comprises means for processing and/or facilitating a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of providing an architecture for delivering mixed reality content, according to one embodiment;

FIGS. 3A and 3B are flowcharts of a process for providing seamless interaction in mixed reality, according to one embodiment;

FIG. 3C is a flowchart of a process for providing an architecture for delivering mixed reality content, according to one embodiment;

FIGS. 4A and 4B are diagrams of user interfaces utilized in the process of FIGS. 3, 4A, and 4B, according to various embodiments;

DESCRIPTION OF SOME EMBODIMENTS

Figure 1B:
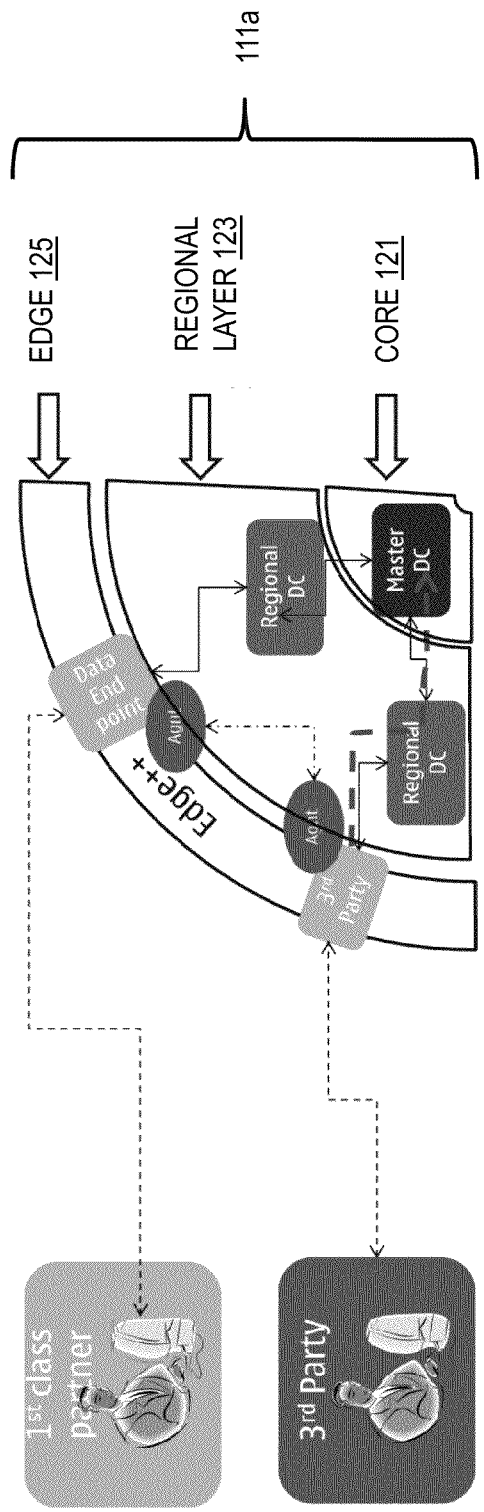
FIG. 1B is a diagram of layered cloud computing architecture for delivering mixed reality content, according to one embodiment.

Examples of a method, apparatus, and computer program for providing an architecture for delivering mixed reality content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

FIG. 1A is a diagram of a system capable of providing an architecture for delivering mixed reality content, according to one embodiment. It is noted that mobile devices and computing devices in general are becoming ubiquitous in the world today and with these devices, many services are being provided. These services can include augmented reality and mixed reality, services and applications. Augmented reality allows a user's view of the real world to be overlaid with additional visual information. Mixed reality allows for the merging of real and virtual worlds to produce visualizations and new environments. In mixed reality, physical and digital objects can co-exist and interact in real time. Thus, mixed reality can be a mix of reality, augmented reality, virtual reality, and enforced with three dimensional (3D) map rendering and corresponding 3D map tiles (e.g., augmented reality tiles), or a combination thereof.

A benefit of using such applications allows for the association of content to a location, or to one or more structures (e.g. buildings, roads, etc.) in the location, wherein the structure in a virtual world may be presented as a 3D object. The content may be shared with others or kept for a user to remind the user of information. Typically, the more precise a structure is defined, the more useful the content.

In one embodiment, a seamless interaction system between a user and mixed reality is built with several subcomponents naturally combined such as, for example, mixed reality scenery, a number of home screens in the mobile or nomadic device, backend support provided by a certain cloud infrastructure and corresponding API extensions, and some other nomadic device with similar capabilities. However, seamless interaction between the user and a mixed reality environment is hard to achieve. For example, reasoning in the real world may be based on various behavioral profiles while the augmented reality concepts may lack access to. In order for a mixed reality system to be capable to reach conclusions and offer solutions based on real facts, artifact detections can be performed to extend the current augmented reality concepts, wherein reasoning engines can be applied so that users and mixed reality systems provide scenes, operations and processes such as what to do or where to go while taking into account behavioral profiles.

Moreover, traditional systems generally do not support very flexible mechanisms for dynamic computational resources available, which is particularly important when implementing mixed reality applications. For example, scaling a mixed reality system to accommodate increasing numbers of users, locations, and mixed reality operations, it becomes increasingly important to achieve efficient use of computational resources, connectivity resources (e.g., resources for transferring mixed reality content (e.g., 3D data tiles such as augmented reality tiles, map tiles, etc.) between the cloud, servers, content providers, etc. and end user devices), and other system resources (e.g., storage, memory, etc.).

By way of example, mixed reality is a particularly challenging case generally consisting of at least three data and processing intensive tasks that are typically accomplished in real time to provide a good user experience:

(1) The user device must capture a stream of raw data describing the environment sensors such as imaging sensor, inertial sensors, positioning sensors etc. This data is often processed into a higher representation (e.g., extracting feature points from images) for processing, which can be very resource intensive.

(2) The sensor data is then processed to determine, for instance, the position, orientation, scale, etc. of the device's view of the world at the current instant. This may entail matching a sparse set of image features against a massive database of local or global feature points, of which a local copy of at least proximate points may be made.

(3) Upon completion of steps 1 and 2, the device then integrates the "augmenting" data into the current representation of the world (e.g., videostream, audiostream, etc.) such that the data aligns to the current view at the current instant.

These tasks clearly place heavy requirements on supporting systems in terms of connectivity and processing, and the optimal balance between client and remote processing of these tasks may vary depending on the capabilities of the client and the particular mixed reality experience.

To address this problem, a system 100 of FIG. 1 introduces the capability to provide an architecture for delivering mixed reality content (e.g., 3D data or map tiles). In one embodiment, the system 100 consists of several sub components to form a seamless architecture between location, mixed, reality, and connectivity. Those subcomponents are naturally combined: map tiles, mixed reality tiles, in the mobile or nomadic device, and connectivity options (e.g., from medium range connections such as cognitive radio (CR) to short range or close proximity connections such as radio frequency memory tags, Bluetooth, other short range radio protocols, etc.) with back end support provided by, for instance, a cloud computing infrastructure and corresponding application programming interface (API) extensions, as well as some other nomadic devices with similar capabilities. In this way, the system 100 evaluates overall system data flows, workloads, etc. to provide appropriate levels of system connectivity, memory, storage, and processing power provisioning.

In one embodiment, the illustrated system 100 forms a baseline (1) to construct mesh granularity for dynamic computation, (2) to support proper computations at/to the edges of a content delivery system, (3) to utilize pre-fetched regional data structures and regional databases and appropriate of endpoint structures (e.g., near field communications (NFC) tags or other radio frequency (RF) memory tags) for delivery of mixed reality content. In one embodiment, the system 100 takes as a baseline the notion of composition of digital objects (described in more detail below with respect to FIGS. 4A and 4B) with the possibility of creating (less or more used, dense) artifacts (or artifact clusters) above the digital objects (clusters) with different metadata sets. The system 100 also expands the notion of encapsulation these clusters or artifacts into the digital objects. By way of example, such digital objects consist of data and computations. Interaction results for these objects are formed when combining location-based data such as map tiles, with mixed reality tiles with the available connectivity options (e.g., connectivity options for delivering the objects or mixed reality content within the system 100 as well as to user devices for rendering). In one embodiment, computational activity is derived based, at least in part, on how dense these three components (e.g., map tiles, mixed reality tiles and connectivity used between "client" and "server") are. In addition, the system 100 provides mapping of digital objects, runtime executions, association of metadata, and determining how dense computational links are between mobile devices and different parts of the cloud (e.g., edge, core, regional layers). For example, when a user access mixed reality digital objects by, for instance, dragging digital objects to a user interface launch pad (as described in FIG. 5B below), the system 100 decomposes the objects and corresponding computations for execution (e.g., executing computations to determine available connectivity connections).

In one embodiment, the system 100 expands traditional mixed reality concepts by generating a geographical mapping of mixed reality content such as map tiles, augmented reality tiles, 3D data, corresponding digital objects, and available connectivity options to facilitate provisioning of resources across architectural layers of a cloud computing architecture. In one embodiment, the system 100 can also apply reasoning engines to various embodiments of the approach described herein to provide additional functionality. For example, behavioral profiles can be taken into account to personalize delivery of mixed reality content to a user. For example, the style and outlook of these realities maybe different, e.g. sliced, with or without borders, increased and decreased outlooks. In particular, when slicing the three components (map-tiles, mixed reality tiles, 3D data, and connectivity), the computational activities are found easily between system front-end and backend. In other words, the system 100 can determine what mixed reality content (e.g., map tiles, augmented reality tiles, etc.) are most often accessed by users and from which component of the delivery architecture (e.g., server, client, edge, cloud, etc.). In one embodiment, the user controls the details or amount of information about what content is being requested that are pushed to the provider.

In another embodiment, the architecture enables the formation of different end point layers, for different use cases (e.g. private, work, hobby, etc.) for different locations, mixed reality and connectivity options. It also allows forming different classes with/without priority, with certain service discovery parameters. For example, close proximity connectivity (RF memory tags) provides certain marks visible to alert user of the availability of mixed reality content. In this way, the user can touch his device to the RF memory tag to update map and mixed reality tiles as well as any parameters, computations, etc. that are needed to process the new content.

In one embodiment, the system 100 refers to mixed reality tiles as a short-hand description for an architecture that chunks geographically indexed mixed and augmented reality applications data for easier indexing, cross-indexing, delivery and caching. Embodiments include geo-indexed representations of 3D mesh data representing building models, ground terrain etc, geo-indexed representations of street imagery, geo-indexed representations of images, image-feature points, and/or image feature descriptors across multiple scales for planes at a given location, geolocated point cloud data representing image feature points or image descriptors, and data, links to data, or datastreams representing the additional media to be augmented in the current view on reality (including non-visual modalities).

In another embodiment, in order to provide a seamless interaction between a user of a user equipment and mixed reality, the interaction is enabled by the mixed reality platform 103 through creating of decomposable digital objects (artifacts) and use of functional chains available in the user equipment or in one or more computation clouds accessible by the user.

In one embodiment, for the purpose of decomposition, a certain virtual area, presented and supported by the user equipment can be utilized, where the digital objects can be parsed in order to map the data and computational parts against the computational ontology used and respective functional elements. In one embodiment, a computational ontology consists of capabilities of energy consumption, security enforcement, privacy polies, other rule enforcement, and the like. Furthermore, the functional elements can be provided by the user equipment or by any other computing devices, for example, one or more neighbor devices over some communication means, a server in the cloud, etc. or a combination thereof.

In one embodiment, the digital objects presented and exposed by the mixed reality platform 103 are constructed from the data and respective processes presented with computation closures of computation spaces, enforced with particular decomposition techniques, while applying relevant privacy adjustments.

As shown in FIG. 1, the system 100 comprises sets 101a-101n of user equipment (UEs) 107a-107i having connectivity to the mixed reality platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, close proximity network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computation closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices, where devices can be peer devices, accessories, mobile readers/writers, or a combination thereof. Additionally, the computational operations and content transmissions can be between devices and tags, where content read/write takes place among devices and tags, with minor or no computational operations at tag side.

In one embodiment, the process of interaction between a user of UE 107a-107i and mixed reality may consist of several stages of operations such as, for example, bootstrapping, usage, end titles, etc. In one embodiment, the bootstrapping operation may include augmenting a scene (e.g. a video stream, an audio stream, one or more still images, etc.) with anchors, wherein anchors are empty artifacts or digital objects. The bootstrapping operation may also include definition of digital objects and attaching them to the selected anchors. The user may define a certain number of digital objects in an augmented reality view with associated data and computations.

In one embodiment, during the usage operation a user of UE 107a-107i is enabled by the mixed reality platform 103 to select and drag digital objects in order to undertake certain actions. For example, a user interested in museum tours, may select a certain museum, select a route to the museum, select points of interest associated with the museum, check the schedules associated to the points of interest and check whether the schedules are based on invitation or for the public. The user may be also given the capability to update existing digital objects by injecting a new or updated digital object into a data repository 117 or other storage areas managed by the mixed reality platform 103.

In one embodiment, during the end titles operation a user is enabled to define a subset of digital objects with restricted view (number of properties). It is noted that, a restricted area may have no digital objects or may not be justified according to the user's personal settings.

In one embodiment, results from/to digital objects that are dragged between user and mixed reality are gathered. Such digital objects consist of data and computations. Interaction results are gathered when object is dragged to a dedicated area, or to the right place of a scenery (e.g. from mixed reality to home screens or vice versa). Digital objects gather results from initial computations at home screen and updated objects are dragged back to mixed reality. This provides interactions, computations and service discovery. Additionally, one or more digital objects may be enabled in mixed reality after an RF tag has been touched in real world.

In one embodiment, a user can control the details that are pushed to the provider (shown in the mixed reality). The style and outlook of these realities can be different, for example sliced, with or without borders, increased and decreased outlooks, etc.

In one embodiment, the digital objects are generated by the mixed reality platform 103 via basic projection and injection functionalities. In order to project from an information space 113a-113m, a computation space 115a-115m, or a combination thereof, a partitioning function can be used. Similarly, in order to return the contents of a projected information space or computation space back into the space, the projected space is injected back under a filter. The filter removes any inserted information or computation that is not to be injected. The injection also induces a merge of information over any projected spaces, where multiple spaces exist.

In one embodiment, seamless interaction between the user and mixed reality is used for rich media content processes, what user requires from reality scenes and communications.

In one embodiment, projection and injection of the user and mixed reality forms behavioral patterns and operations between the realities. In case of projection, a triggering event, for example provided by a query, is received for projecting computation closures from an augmented reality computation space 115a-115m, representing a digital object.

In one embodiment, a subset of information content from the augmented reality information space 113a-113m associated with a digital object is extracted by using a partitioning function. Furthermore, a run-time information space is created in cloud 111a-111n using the extracted subset of information content.

In one embodiment, an injection operation includes receiving a triggering event, for example a query, to inject computation closures into an augmented reality computation space 115a-115m. Prior to the injection, it is determined whether the computation closure and the augmented reality computation space exist. Furthermore, if the closure and the augmented reality information/computation spaces exist, it is determined whether the computation closure is on a list of information/computation spaces projected from the augmented reality information/computation space.

In another embodiment, if the computation closure is on the list of information/computation spaces projected from the augmented reality information/computation space, a filtering function is applied on the information content of the computation closure and any other information spaces projected from the augmented reality information space. Additionally, the filtered information content is added to the information content of the augmented reality information/computation space.

In one embodiment, any artifacts within the pointing direction of an input equipment (e.g., camera, camcorder, microphone, etc.) are selected to detect any digital objects that are projected and or injected between user and mixed realities. For example, when a mobile device points to a magazine including information such as brand name, certain text, picture etc., it picks up various artifacts from the pointing direction (coverage, scenery). The mixed reality platform 103 can detect which digital objects are available. It is also able to make implication analysis of when and how objects information is dragged out.

In one embodiment, the projection and injection of information and/or computations between a user and mixed reality behavioral patterns, and operations between these realities is formed in multiple stages. In one embodiment, a composition of behavioral patterns is added to the identity of the user and the mixed reality architecture. It is noted that projection and injection are baseline functions.

In one embodiment, one or more functional elements for the event/object are set, wherein the object is read as data, the process that is going to be applied on the data is determined and the functional element is formed based on the data and the determined process. For example, computation closures from computation spaces 115a-115m can be utilized as fine grain processing mechanisms to describe projection and injection.

In one embodiment, the mixed reality platform 103 may cover any item (e.g., digital object) that can be created and updated for a user of UE 107a-107i and for the mixed reality platform 103. The digital objects can be utilized by barcode readers, text recognition readers, RF memory tag readers/writers containing readable/writable digital objects, etc. For example, while viewing a magazine, the name of the magazine can provides suitable item characteristics. A user of UE 107a-107i may point the UE to the magazine's brand name, certain text, picture, etc. and picks up various artifacts from the pointing direction (coverage, scenery, etc). With reasoning applied, the mixed reality platform 103 it is able to detect what digital objects are available, in the data repository 117 or within the mixed reality platform 103 or a combination thereof, for the magazine's reality. Furthermore, the mixed reality platform 103 can detect implications associated with the digital objects, wherein the implications are activated when object(s) information is dragged out. Additionally, the mixed reality platform 103 may recognize other data associated with the digital objects, for example, data other than the bar codes.

In one embodiment, the mixed reality platform 103 can be associated with a cognitive radio system (not shown). The cognitive radio connectivity can enable transmission of context information, locations, and recognized objects in a particular event, other object and their neighborhoods. The cognitive connectivity can also transmit behavioral patterns affecting a user of UE 107a-107i, mixed reality projection and injection, functional elements attached to particular places, spaces, times, users, scenes, etc.

In one embodiment, the data such as time, event, place, space, users, scenes, etc. associated with a specific user's personal information is taken from the user's spaces such as for example user's calendar events, wherein the user can control the limited data profile available from the context specific databases. Furthermore, the selected augmented data is responded back. The user's own agent can do reasoning on selected data and provide collected entity combining the data and the reasoning with controlling functionality, to release only the minimum information needed for a process. In other words, a user of UE 107a-107i knows and controls his/her own data. It is noted that typically in augmented reality systems a high volume of data resides elsewhere and is beyond user's own control. However, the mixed reality platform 103 allows projection of data to the user's own space. A user's own data settings can be much bigger than what is relieved to the system when a digital object is dragged between the user and the mixed realities display on the UI 109a-109i. Furthermore, the information attached to the dragged object is updated to/from a launch pad area of the UI or to another particular area.

In various embodiments, the style, outlook and appearance of the user and mixed reality displays may be different based on operations done with projection and injection activities such as, for example, sliced equally (or ⅓, picture in picture), with outlook borders, increased and decreased outlooks depending on the projection or injection functionalities, etc. Therefore, the outlook and style can adapt to the focus point selected by the user.

Furthermore, projection and injection may include transmission of mixed reality identifies and delivering preliminary metadata associated with the object, if the metadata exist, to/from a launch pad, pulling selected area or object to the launch pad (from mixed reality screen to user reality home screen launch pads, or vice versa), selecting or turning the object direction, where to drag (from mixed reality display to user reality home screen or vice versa) if necessary, or a combination thereof. Additionally, a user may have the ability to tap other objects, move all tapped object to the launch pad, and tap the launch pad area, to retrieve context menu or a drop down list.

In various embodiments, the user and mixed reality display may consist of one or more launch pads.

In one embodiment, the behavioral pattern may be tied to a number of items tapped, dragged through launch pad, or only those that match the results of a query. The mixed reality platform 103 may provide free form of input query area, one line search query area, URL links to number of objects, or a combination thereof to the user of UE 107a-107i.

In one embodiment, the user of UE 107a-107i and the mixed reality display on UI 109a-109i may have interfaces as one option, or formed as rectangular areas that grow, increase or decrease in size.

In one embodiment, several subcomponents such as mixed reality scenery, a number of home screens in the mobile or nomadic device, backend support provided by a certain cloud 111a-111n infrastructure and corresponding Application Programming Interface (API) extensions, some other nomadic device with similar capabilities, etc. are naturally combined.

In one embodiment, if multiple home screens are available, they can be merged, further divided into multiple sub-screens, or a combination thereof, if needed.

In one embodiment, the operational mode consists of observing augmented reality stream with digital objects or anchors. The augmented reality window can be adjusted in either two or more views tiled along the sides of each other, where at least one should represent a home screen with application launch pad.

In one embodiment, the launch pad enables dragging of the digital object from augmented reality side or other screens. Once a digital object is within a launch pad area, the process of digital object decomposition takes place. A launch pad can work as a primary parser, execution strategy enabler and process mapper along with data.

In various embodiments, operations are always bi-directional, wherein the functional properties along with relevant data can be gathered from one or more home screens and either a certain digital object can be associated or new digital objects can be created.

In one embodiment, digital objects can be placed back to the augmented reality side (screens) wherein the object can update already existing augmented or digital objects or can be placed in newly defined and activated anchors.

In one embodiment, a home screen can hold several applications (functional chains constructed out of the computation closures and connected into branches).

In one embodiment, once a digital object is dragged from augmented reality screen to home screen the following may occur:

$$A\{Adata, Acomp\} \rightarrow decompose\{A\} \rightarrow \{Adata, Acomp, Map[Adata], Map[Acomp], ExecStrategy, Branches, Options\} \quad (1)$$

wherein A is a digital object compose of data, Adata and computation closures Acomp. The digital object A is then decomposed into Adata, Acomp (Adata and Acomp are allocated according to a particular runtime environment), Map[Adata] and Map[Acomp] are parsed with process mapper in order to determine certain executables to be executed against the Adata. The ExecStrategy is constructed and updated with a mapping of execution results. The Branches and Options represent number of branches and number of options and are taken into the functional chains selection process before actual execution starts.

Figure 4A:
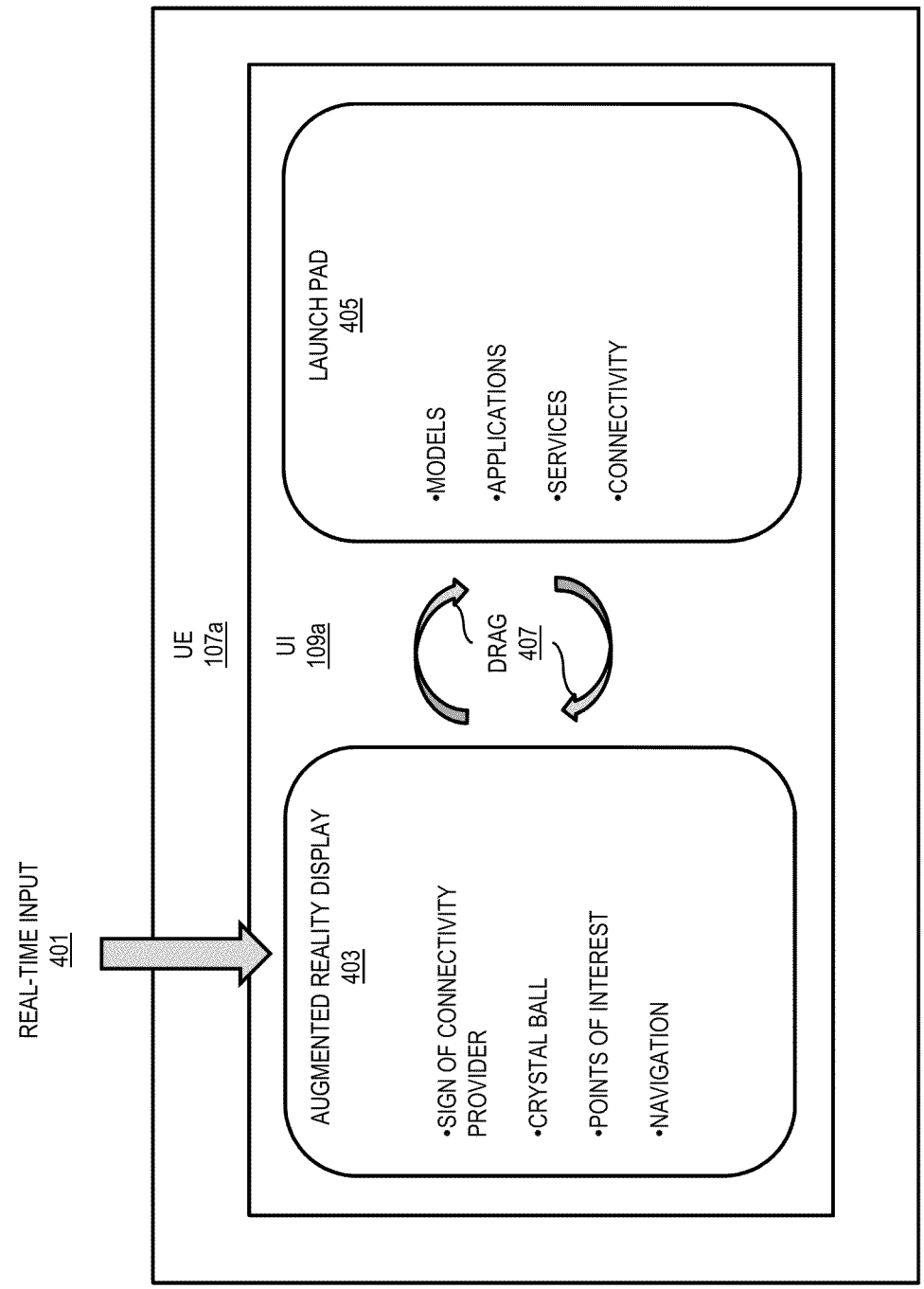

In one embodiment, once the functional elements are gathered on a home screen, the process of migration and projection takes place, as a reverse of the decomposition process (1). Furthermore, the size and the position of augmented reality screen can be adjustable as seen in the embodiments of FIGS. 4A and 4B.

By way of example, the UEs 107a-107i, and the mixed reality platform communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of layered cloud computing architecture for delivering mixed reality content, according to one embodiment. As discussed above, among other things, the various embodiments described herein are to provide a seamless combination of locations, users, mixed reality content, and the right or appropriate level of connectivity for delivering the mixed reality content. In one embodiment, client devices (e.g., UEs 107) may have different capabilities in terms of, for instance, computation, data storage, connectivity, etc., thus fine grained structures behind digital objects (e.g., artifacts, clusters, etc.) can be important determining appropriate provisioning of those resources for delivery of mixed reality content. In other words the structures (e.g., clusters—see the process 340 of FIG. 3C below for additional information about clustering) contribute to provision of the resources available from various architectural layers of the cloud 111 because the system for delivering mixed reality content is dynamically spanned around virtual and physical components of the cloud 111.

As shown in FIG. 1B, the cloud 111a consists of three architectural layers, a core layer 121, a regional layer 123, and an edge layer 125. The core layer 121 hosts the components that originate a particular mixed reality application or service, the regional layer 123 provide replication and workload distribution of the functions of the core layer 121 using regional servers, and the edge layer 125 hosts data end points that interface with client devices (e.g., UEs 107). In one embodiment, service level APIs are outsourced from the core layer 121 to the regional layer 123 and beyond to the edge layer 125. Each of the layers are considered contributing nodes of the overall cloud infrastructure 111a that include components that can be provisioned to provide a particular mixed reality application or service.

In one embodiment, the system 100 leverages the computational load associated with the mixed reality application or service among the various layers through the mixed reality digital objects. These digital objects, for instance, include location-based data such as map tiles, augmented reality tiles, as well as connectivity information (e.g., CR resources). These digital objects include the computation closures for processing and/or other managing the location-based or mixed reality data contained therein. In this way, functions such as regional databases, coexistence managers for determining connectivity options, etc. can be outsourced from the core layer 121 to the regional layer 123 and/or the edge layer 125. Thus, in one example, computational workload associated with a mixed reality service can be intelligently moved by taking AR and map specific features into account (e.g., resolution, level of detail, and other performance critical attributes). In this way, the system 100 increases the computational elasticity of mixed reality applications by enabling migration of both data and computations from one architectural layer to another.

In one embodiment, the approach for granular digital object composition and decomposition is defined as a function of the capabilities of the end device, congestion of the data/computational point on the edge layer 125 (e.g., latency bucket) and the computational/data support of the back-end (e.g., core layer 121 and/or regional layer 123). In one embodiment, the support consists of:

(1) constructing mesh granularity to identity more and less dynamic computations;

(2) supporting computation or digital object migration from the core 121 to the edge 125;

(3) pre-fetching or caching of regional data structures and regional databases with appropriate levels of connectivity; and (4) identifying what endpoints are used and how frequently their contents are updated based on, for instance, monitoring requests from user devices received at the end points.

In one embodiment, location (map tiles) and mixed reality (AR tiles) together with dense connectivity (e.g. CR options) computational activities are partially rendered at device and back-end side. One set of these components (map tiles, AR tiles, CR options) could form one country specific computational activity domain. They form certain clusters with certain thresholds between user device density and (core/edge of) cloud needs. Similarly, one set of components could form a temporary installation specific computational activity domain, e.g. pertaining to a densely visited but temporary event like Olympic games, Shanghai Expo 2010, etc. In another embodiment, a set of components could form a narrower cluster within a broader cluster as a subset representing similar component requirements with exceptions (e.g. exceptions in pre-processing, differentiating requirements for differently powered devices for the same user case, or exceptions in latency budgeting differentiating see-through augmented reality cases from street-view imagery based mixed reality cases).

Figure 1C:
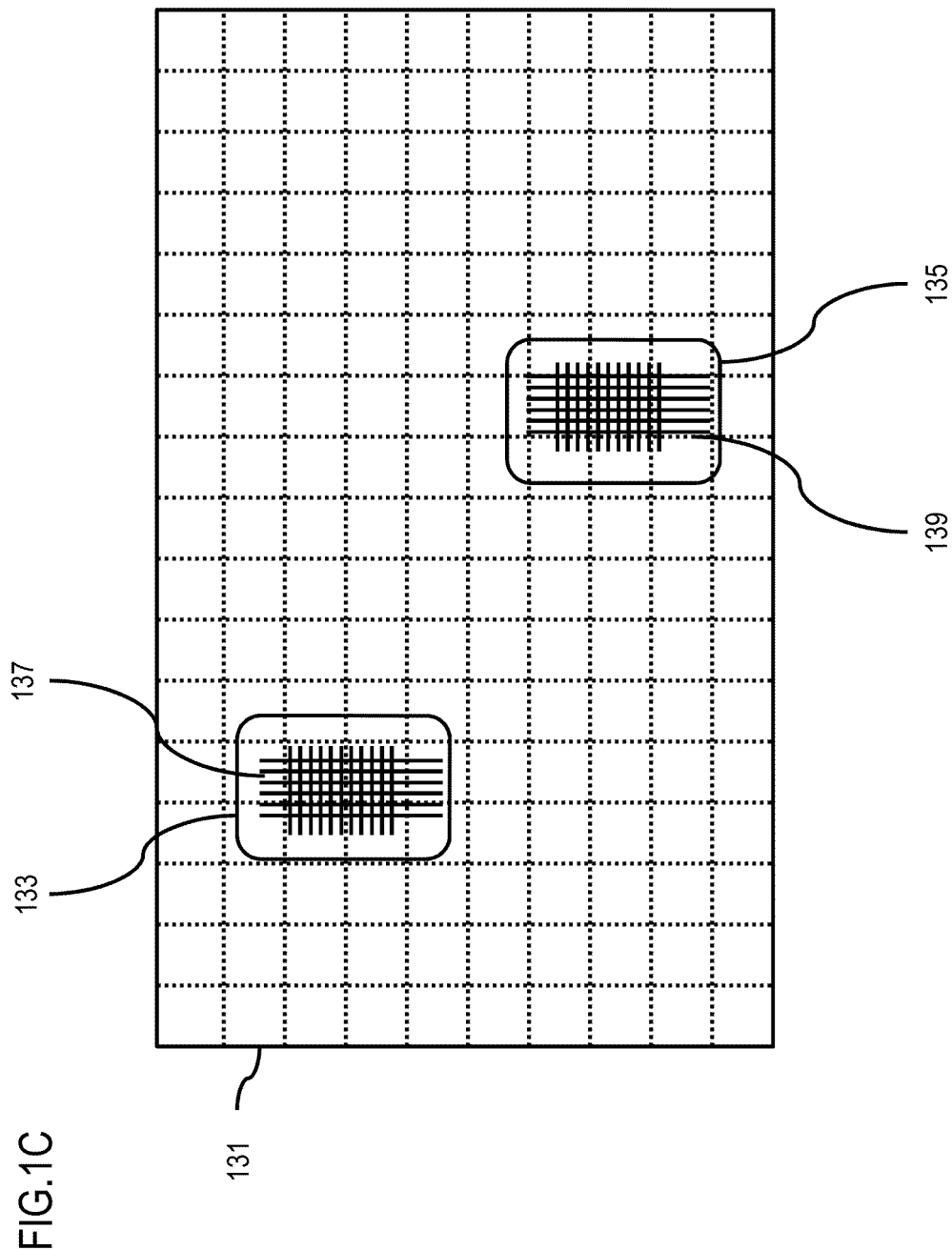
FIG. 1C is a diagram depicting geographic clustering of mixed reality digital objects for delivery over a cloud computing architecture, according to one embodiment.
Figure 1D:
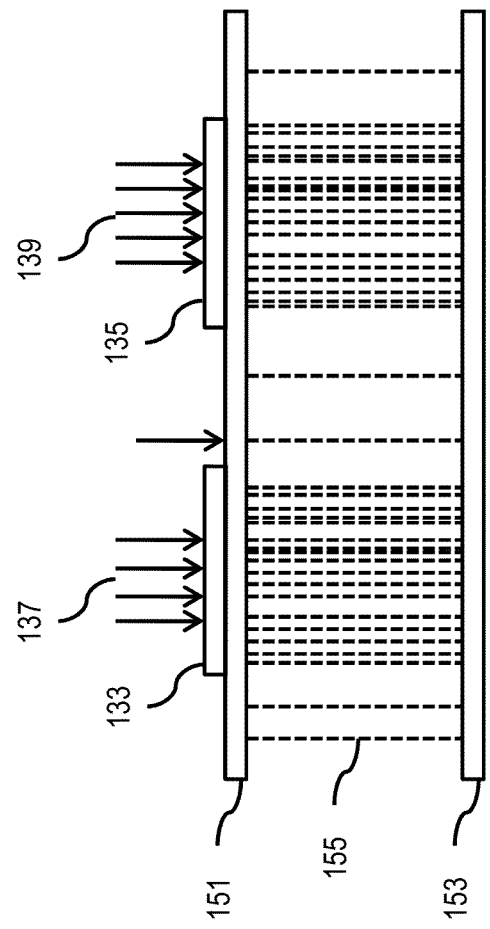
FIG. 1D is a diagram depicting request and data flow between layers of an architecture for delivering mixed reality content, according to one embodiment.

FIG. 1C is a diagram depicting geographic clustering of mixed reality digital objects for delivery over a cloud computing architecture, according to one embodiment. FIG. 1D is a diagram depicting request and data flow between layers of an architecture for delivering mixed reality content, according to one embodiment. Both FIGS. 1C and 1D relate to a mapping of digital objects and where computation links involving those objects occur. As previously discussed, in one embodiment, the system 100 forms a baseline to construct mesh granularity for dynamic computation for provision resources across the cloud infrastructure 111 for delivering mixed reality content. As part of constructing the mesh granularity, the system 100 provides mapping of digital objects, runtime executions, computational links, etc. over a geographical area representing the locations associated with the digital objects (e.g., map tiles, AR tiles, etc.).

As shown, FIG. 1C presents a diagram that shows less used and more used digital objects mapped onto a geographical area 131 represented by the digital object. Each square represents a map tile and/or AR tile. Accordingly, the diagram represents an index of map tiles, AR tiles with details of their computations. For example, first, the system 100 enables tile constructions (map tiles, AR tiles) and indexing (mapping dynamically applications) and provides details for computations.

Based on this mapping, the system 100 determines and forms clusters (e.g., cluster 133 and cluster 135) of data accesses (e.g., data accesses 137 of cluster 133; and data accesses 139 of cluster 135) and respective computations. In one embodiment, the clusters 133 and 135 represent digital objects that are most frequently used, requested, processed, etc. The cross-hatches representing the data accesses 137 and 139 represent the densities of computational links, requests, etc. associated with the respective digital objects, map tiles, AR tiles, etc. For example, the system 100 pins out data encapsulations for computations based on the clusters. In one embodiment, the physical location of the clusters can be used to determine what kind of storage data would be needed and where to move the data storage.

In one embodiment, the system 100 can also process the determined locations of the clusters to define connectivity where mixed reality content pays and maps certain processes against connectivity availabilities. For example, if many requests or computations are associated with mixed reality content for rendering a popular point of interest. The system 100 can recommend the place of RF or NFC memory tags at the location for distributing updated mixed reality content and associated computations. In this case, the system 100 can also construct the mesh granularity in which the level of granularity of the computations can be determine based on resource availability, computational density, etc.

FIG. 1D depicts a slicing of the mapping 131 of FIG. 1C from an edge on perspective of the mapping 131. The slicing enables viewing of the underlying architecture supporting the mesh computation map, with line 151 representing the front-end of the cloud architecture (e.g., endpoint or edge layer 125) and line 153 representing the back-end (e.g., regional layer 123, core layer 121). In this view the clusters 133 and 135 are also view edge on with their respective data accesses or requests 137 and 139 represented by arrows. Further the computation links 155 between the front-end 151 and the back-end 153 also represent the relative densities of the computations associated with clusters 133 and 135. The density of the links 155 can be used to determine whether to migrate or provision digital objects from the back-end 153 to the front-end 151 to improve resource distribution and workload.

In one embodiment, the front-end 151 can also represent different end points associated with the data accesses or requests. These end points can be further segmented into business uses, private users, and other classes of usage. The artifacts or clusters 133 and 135 enable, for instance, decomposing and analyzing computations to provide the execution strategy for scheduling attachment processes at the end device or the cloud 111 for delivering mixed reality content (see the discussion with respect to FIG. 4B for more details).

Figure 2:
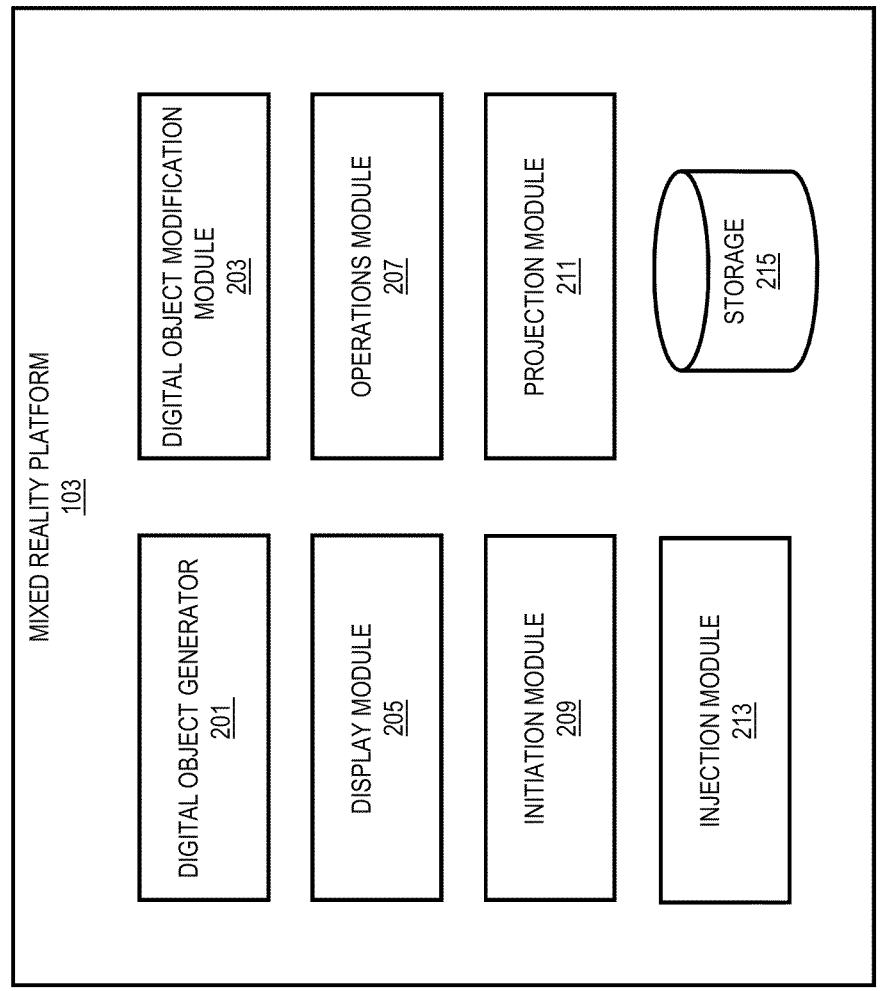
FIG. 2 is a diagram of the components of an mixed reality platform, according to one embodiment.

FIG. 2 is a diagram of the components of the mixed reality platform, according to one embodiment. By way of example, the mixed reality platform includes one or more components for providing seamless interaction in mixed reality. It is contemplated that the functions of these components may be combined in one or more components or performed by other components of equivalent functionality. In this embodiment, the mixed reality platform includes a digital object generator 201, a digital object modification module 203, a display module 205, an operations module 207, an initiation module 209, a projection module 211, an injection module 213, and storage 215.

Figure 3B:
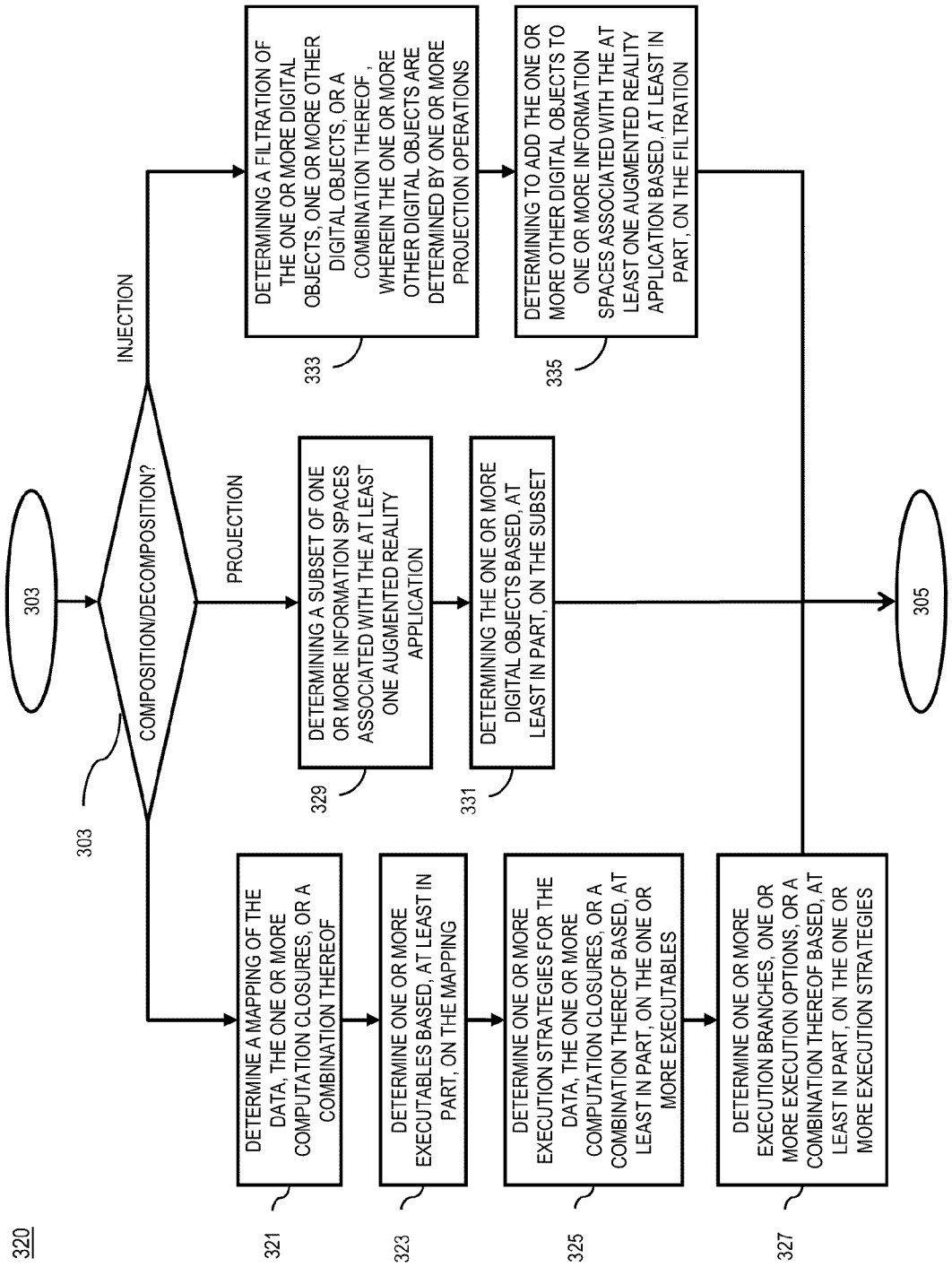
Figure 6:
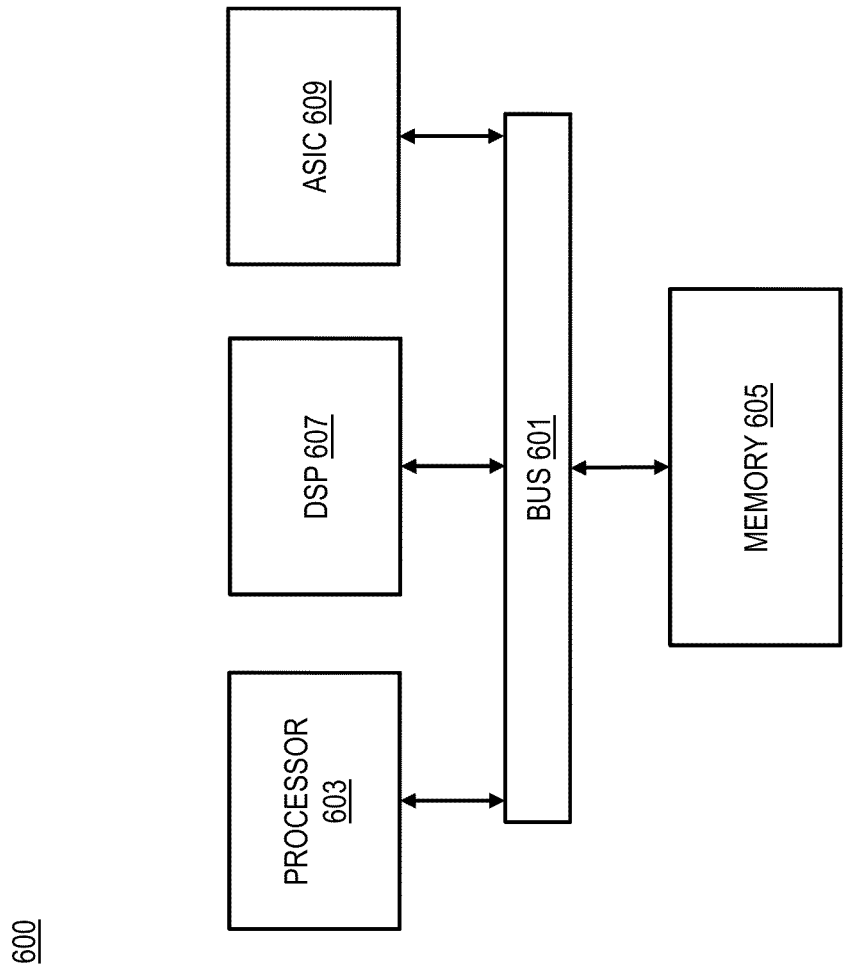
FIG. 6 is a diagram of a chip set that can be used to implement an embodiment of the invention.

FIG. 2 is described with respect to FIGS. 3A-3C, wherein FIGS. 3A and 3B are flowcharts of a process for providing seamless interaction in mixed reality and FIG. 3C is a flowchart of a process for providing an architecture for delivering mixed reality content, according to various embodiments. In one embodiment, the mixed reality platform performs the processes 300, 320 or a combination thereof and is implemented in, for instance, a chip set including a processor and a memory as shown in FIG. 6.

In one embodiment, per step 301 of flowchart 300 of FIG. 3A, the digital object generator 201 processes and/or facilitates a processing of media information associated with at least one augmented reality application of UE 107a-107i to determine one or more digital objects, wherein the one or more digital objects aggregate, at least in part, data for defining the one or more digital objects, one or more computation closures acting on the data, one or more results of the one or more computation closures, or a combination thereof. The data may be determined from the information space 113a-113m, from the data repository 117, from the storage 215, or a combination thereof. Similarly, the computation closures may be determined from the computation spaces 115a-115m, from the data repository 117, from the storage 215, or a combination thereof. Furthermore, the digital objects, the data, the one or more computation closures, the one or more results or a combination thereof may be stored in data repository 117, in storage 215 or a combination thereof.

In one embodiment, per step 303 of FIG. 3A, the digital object modification module 203 causes, at least in part, a composition, a decomposition, or a combination thereof of the one or more digital objects. The digital object modification module 203, per step 305 of FIG. 3A causes, at least in part, an enhancement, a modification, an initiation, or a combination thereof of one or more functions associated with the at least one augmented reality application of the UE 107a-107i.

In various embodiments, as seen in flowchart 320 of FIG. 3B, the composition, the decomposition or a combination thereof of the one or more digital objects may comprise application of various functions on the digital objects.

In one embodiment, per step 321 of FIG. 3B, the initiation module 209 determines a mapping of the data, the one or more computation closures, or a combination thereof. The mapping can represent the mapping can identify relationships between the data items (e.g., between real world data and augmented reality data), between the computation closures and data (e.g., identifying the functions that are being applied on the data), or a combination thereof. The mapping results may be stored in the data repository 117, in the storage 215, or a combination thereof.

In one embodiment, per step 323 of FIG. 3B, the initiation module 209 determines one or more executables based, at least in part, on the mapping. The executables are associated with the functions determined by the mapping. The executables may be stored in the data repository 117, in the storage 215, or a combination thereof.

In one embodiment, per step 325 of FIG. 3B, the initiation module 209 determines one or more execution strategies for the data, the one or more computation closures, or a combination thereof based, at least in part, on the one or more executables. The execution strategies may be determined by the application providers, by the user of UE 107a-107i, by the network management entities managing communication network 105 or a combination thereof. The execution strategies may be retrieved from the data repository 117, from the storage 215, or a combination thereof. Similarly, the determined execution strategies may be stored in the data repository 117, in the storage 215 or a combination thereof.

In one embodiment, per step 327 of FIG. 3B, the initiation module 209 determines one or more execution branches, one or more execution options, or a combination thereof based, at least in part, on the one or more execution strategies. The execution branches, execution options, or a combination may be determined by the application providers, by the user of UE 107a-107i, by the network management entities managing communication network 105 or a combination thereof. The execution branches, execution options, or a combination may be retrieved from the data repository 117, from the storage 215, or a combination thereof. Similarly, the determined execution branches, execution options, or a combination may be stored in the data repository 117, in the storage 215 or a combination thereof.

In one embodiment, the one or more functions associated with the at least one augmented reality application are based, at least in part, on the mapping, the one or more executables, the one or more execution strategies, the one or more execution branches, the one or more execution options, or a combination thereof.

In one embodiment, the mapping, the one or more executables, the one or more execution strategies, the one or more execution branches, the one or more execution options, or a combination thereof are determined, at least in part, via the one or more user interface elements such as a launch pad area, a home screen, or a combination thereof.

In one embodiment, per step 307 of FIG. 3A, the digital object generator 201 processes and/or facilitates a processing of the media information to determine one or more anchor points for the one or more digital objects, wherein the anchor points are empty artifacts or place holders for the generated digital objects.

In one embodiment, per step 309 of FIG. 3A the display module 205 causes, at least in part, a rendering of a user interface for presenting the one or more digital objects in an augmented reality display on UI 109a-109i using the anchor points. The user interface may includes, at least in part, one or more user interface elements, wherein the digital object modification module 203 can use the user interface elements to cause, at least in part, an initiation of the composition, the decomposition, or a combination thereof by the initiation module 209.

In one embodiment, the one or more user interface elements may include, at least in part, a launch pad area, a home screen, or a combination thereof on the UI 109a-109i to which the one or more digital objects are moved to cause, at least in part, the initiation of the composition, the decomposition, or a combination thereof by the initiation module 209.

In one embodiment, per step 311 of FIG. 3A, the operations module 207 determines at least a portion of the data, the one or more computation closures, the one or more results, or a combination thereof from the one or more user interface elements via one or more bi-directional operations.

In one embodiment, per step 313 of FIG. 3A, the digital object generator 201 causes, at least in part, a creation of one or more other digital objects based, at least in part, on the composition, the decomposition, or a combination thereof.

In one embodiment, per step 315 of FIG. 3A, the digital object modification module 203 causes, at least in part, an execution of the one or more functions via the data, the one or more computation closures, the results, or a combination thereof associated with the one or more digital objects, the one or more other digital objects, or a combination thereof.

In one embodiment, per step 317 of FIG. 3A, the digital object modification module 203 causes, at least in part, a rendering of the one or more other digital objects in the UI 109a-109i for causing, at least in part, an update of the one or more digital objects, the one or more functions, the at least one augmented reality application, or a combination thereof.

In one embodiment, as seen in flowchart 320 of FIG. 3B, the composition, the decomposition or a combination thereof of the one or more digital objects may includes, at least in part, one or more projection operations. In this embodiment, per step 329 of FIG. 3B, the projection module 211 determines a subset of one or more information spaces 113a-113m associated with the at least one augmented reality application. Furthermore, per step 331 of FIG. 3B, the projection module 211 determines the one or more digital objects based, at least in part, on the subset.

In one embodiment, as seen in flowchart 320 of FIG. 3B, the composition, the decomposition or a combination thereof of the one or more digital objects may includes, at least in part, one or more injection operations. In this embodiment, per step 333 of FIG. 3B, the injection module 213 determines a filtration of the one or more digital objects, one or more other digital objects, or a combination thereof, wherein the one or more other digital objects are determined by one or more projection operations. Furthermore, per step 335 of FIG. 3B, the injection module 213 determines to add the one or more other digital objects to one or more information spaces 113a-113m associated with the at least one augmented reality application based, at least in part, on the filtration.

Additionally, it is noted that, the intermediate and the final data, computation closures and, results, from the process described in FIGS. 3A and 3B may be retrieved and/or stored in storage 215, in data repository 117, in clouds 111a-111n or a combination thereof.

FIG. 3C is a flowchart of a process for providing an architecture for delivering mixed reality content, according to one embodiment. In one embodiment, the mixed reality platform 103 performs the process 340 and is implemented in, for instance, a chip set including a processor and a memory as shown in FIG. 6. In step 341, the mixed reality platform 103 determines one or more requests for one or more digital objects, wherein the one or more digital objects aggregate location-based data, one or more computations, or a combination for supporting at least one mixed reality application.

In step 343, the mixed reality platform 103 determines one or more densities of the one or more requests with respect to one or more geographical boundaries defined by one or more clusters of the one or more digital objects. The mixed reality platform 103 then processes and/or facilitates a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof (step 345). In one embodiment, the one or more architectural layers include, at least in part, one or more core content delivery layers, one or more regional content delivery layers, one or more edge content delivery layers, or a combination thereof; and wherein the location-based data include, at least in part, one or more map tiles, one or more augmented reality tiles, or a combination thereof.

In step 347, the mixed reality platform 103 causes, at least in part, a migration, a pre-fetching, a caching, or a combination thereof of the one or more digital objects among the one or more architectural layers based, at least in part, on the provisioning, the one or more densities, or a combination thereof.

In step 349, the mixed reality platform 103 determines one or more connectivity types of the one or more connectivity resources used to make the one or more requests. The mixed reality platform 103 then determines which of the one or more architectural layers, the one or more computational resources, the one or more storage resources, the one or more connectivity resources, or a combination thereof to provision based, at least in part, on the one or more connectivity types. In one embodiment, the one or more connectivity types include, at least in part, one or more short range connectivity types, one or more medium range connectivity types, or a combination thereof. In yet another embodiment, the one or more short-range connectivity types include, at least in part, one or more radio-frequency memory tags, one or more short-range wireless radio protocols, or a combination thereof; and wherein the one or more medium range connectivity types include, at least in part, one or more cognitive radio protocols.

In step 353, the mixed reality platform 103 determine one or more movements of the one or more clusters over a geographical area based, at least in part, on the one or more connectivity types. By way of example, the one or more requests made over the one or more short range connectivity types are indicative of the one or more clusters being stationary, and the one or more requests made over the one or more medium range connectivity types are indicative of the one or more clusters moving.

In step 355, the mixed reality platform 103 determines the one or more requests based on one or more links (a) among the one or more architectural layers; (b) among one or more clients and the at least one mixed reality application; (c) among the one or more clients and the architectural layers; (d) among the one or more clients and the at least one cloud computing infrastructure; or (e) a combination thereof. In one embodiment, the one or more densities are further based, at least in part, on the one or more links.

FIGS. 4A-4B are diagrams of user interfaces utilized in the process of FIGS. 3A and 3B, according to various embodiments.

In one embodiment, as seen in FIG. 4A, a real-time input 401 (e.g. a video stream, an audio stream, one or more still images, etc.) is captured by the UE 107a and entered UI 109a. The mixed reality platform 103, as described with respect to FIGS. 2, 3A, and 3B, generates digital objects associated with the input and presents the digital objects in the augmented reality display 403. The augmented reality display 403 may also represent functions that can be applied on the digital objects. Some of the functions can be determination of points of interest, navigation, etc. It is noted that the input may be an already recorded media file such as a video file, an audio file, one or more still images, or a combination thereof.

In one embodiment, a user of the UE 107a can drag icons representing digital objects on the augmented reality display 403 into one or more launch pads 405. The dragging is shown by arrows 407.

In one embodiment, a behavioral pattern can be tied to the number of items tapped, or dragged via arrows 407 by a user of UE 107a and mixed reality launch pad 405, or matched to the results of a query by the user.

In one embodiment, the UI 109a of UE 107a may include free form of input query area, a one line search, a query area, a URL link to number of objects, or a combination thereof. A user of UE 107a may want to stick to the country specific device, or access extra services for example with Google translation between different languages and based on runtime settings.

In one embodiment, upon the determination of the functional elements the projection and injection data, including functional elements, are dragged to a launch pad area 405 on the UI 109a for reasoning user and mixed realities to digital composition. A launch pad 405 may have the capability of creating and updating digital objects between the UE 107a and the mixed reality platform 103. Furthermore, the launch pad 405 may provide backend support and expose processes associated with clouds 111a-111n to the functional elements, if needed.

In one embodiment, projection and injection mechanisms consist of a set of actions such as, for example, selecting the focus point from user or mixed reality display 403, tapping the selected object, dragging or moving (407) the object to the launch pad 405, locating the objects from the launch pad 405, or a combination thereof.

FIG. 4B shows a user interfaces utilized in the process of FIGS. 3A and 3B with a design that is different from the interface of FIG. 4A. In one embodiment, as seen in FIG. 4B, a real-time input 421 (e.g. a video stream, an audio stream, one or more still images, etc.) is captured by the UE 107b and entered UI 109b. The UE 107a displays the input on the digital display 427 while the mixed reality platform 103, as described with respect to FIGS. 2, 3A, and 3B, generates digital objects associated with the input and presents the digital objects in the augmented reality display 423. In this embodiment, the augmented reality display 423 is an extension of the digital display 427 and the mixed reality platform 103 may provide services to the user of UE 107b to toggle between the digital display 427 and the augmented reality display 423 wherein the digital display 427 shows the objects as they are in the input 421 while the augmented reality display 423 may allow the user to apply various functions on the objects and see the results simultaneously and enable the user to compare the objects before and after the application of functions. As seen in FIG. 4B applications APP1, APP2, APP3, APP4 and APP5 are available on UE 107b wherein APP1 and APP2 are applied on object 431 and APP2 involves objects 431 and 433. It is noted that the input may be an already recorded media file such as a video file, an audio file, one or more still images, or a combination thereof.

In one embodiment, a user of the UE 107b can drag icons representing digital objects on the digital display 427, on the augmented reality display 423, or a combination thereof into one or more launch pads 425. The dragging is shown by arrows 429. The results from applying the applications APP1 and APP2 on object 431 may be presented on the launch pad 425.

In the embodiment of FIG. 4B, the APP2 involves object 431 and the augmented reality object 433. For example, the APP2 may be a mixed reality game using a real object 431 and an augmented reality object 433 played on the launch pad 425.

In various embodiments, the mixed reality platform 103 may enable the user of UE 107b to modify the size, number and location of the digital display 427, the augmented reality display 423, the launch pad 425, or a combination thereof.

The processes described herein for providing seamless interaction in mixed reality may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
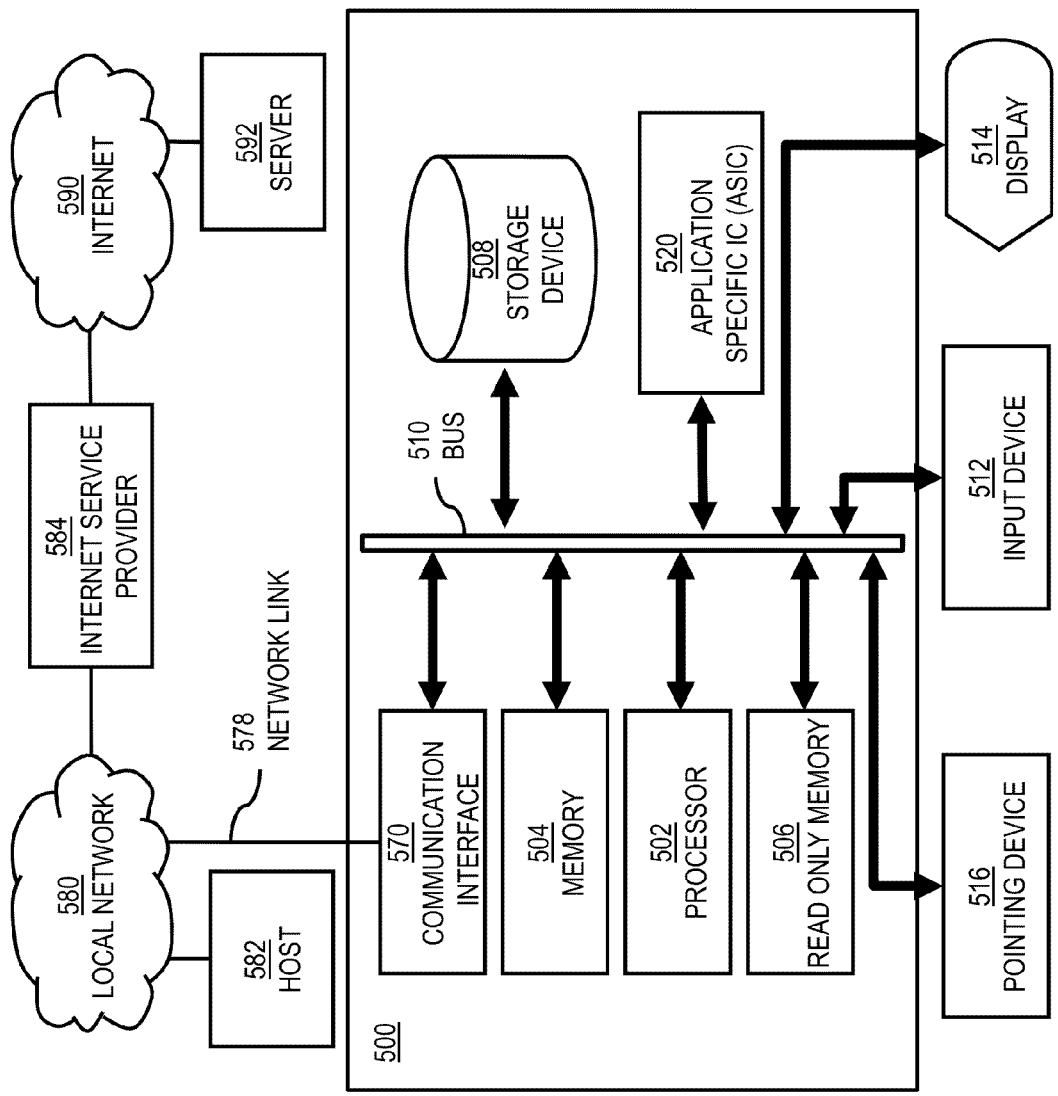
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide seamless interaction in mixed reality as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing seamless interaction in mixed reality.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing seamless interaction in mixed reality. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing seamless interaction in mixed reality. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing seamless interaction in mixed reality, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing seamless interaction in mixed reality to the UEs 107a-107i.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide seamless interaction in mixed reality as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing seamless interaction in mixed reality.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide seamless interaction in mixed reality. The memory 605 also stores the data associated with or generated by the execution of the inventive steps.

Figure 7:
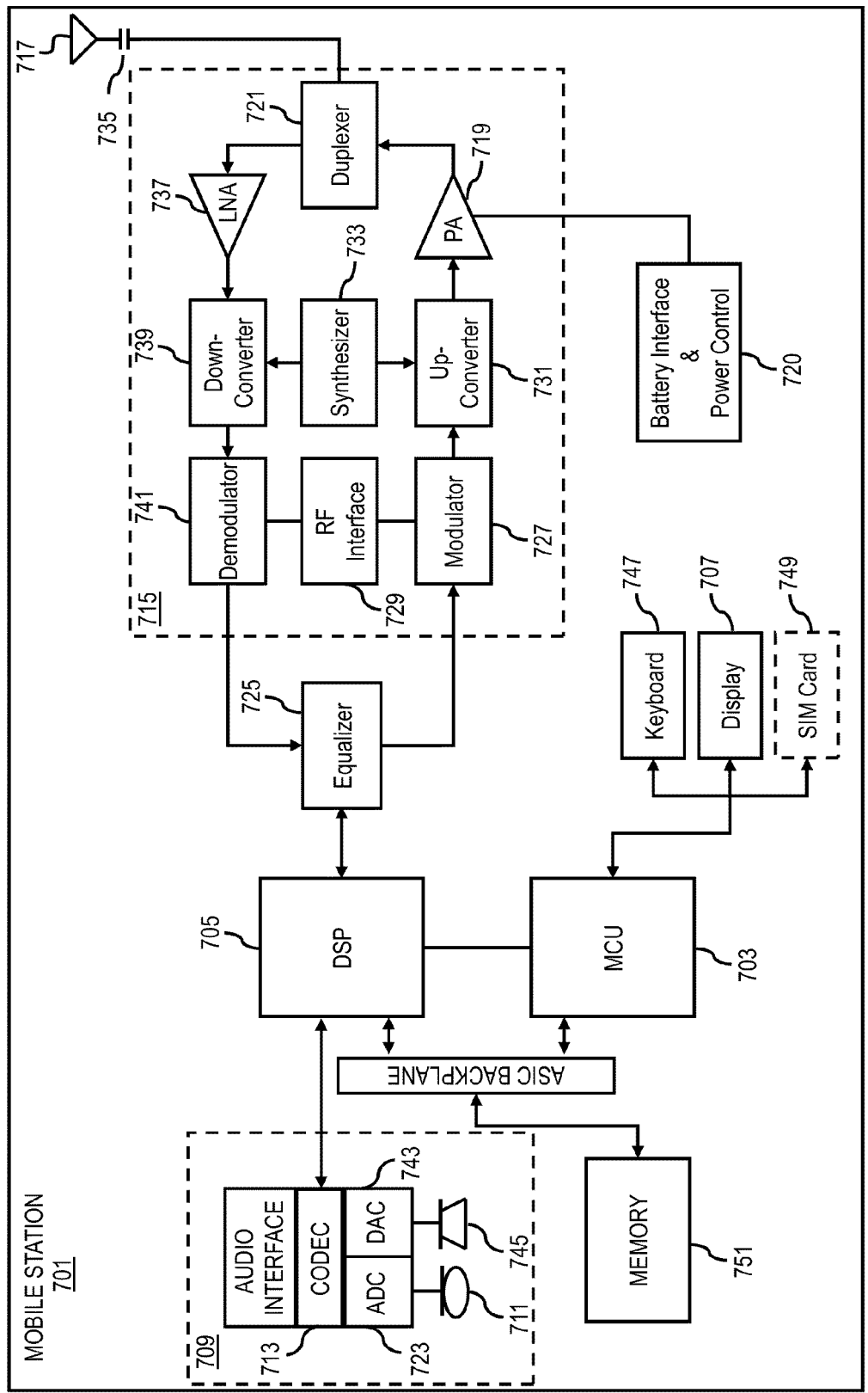
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing seamless interaction in mixed reality. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing seamless interaction in mixed reality. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide seamless interaction in mixed reality. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
determining, using a processor, one or more requests for one or more digital objects, wherein the one or more digital objects aggregate location-based data, one or more computations, or a combination for supporting at least one mixed reality application;
determining one or more densities of the one or more requests with respect to one or more geographical boundaries defined by one or more clusters of the one or more digital objects; and
processing the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

2. A method of claim 1, wherein the one or more architectural layers include, at least in part, one or more core content delivery layers, one or more regional content delivery layers, one or more edge content delivery layers, or a combination thereof; and wherein the location-based data include, at least in part, one or more map tiles, one or more augmented reality tiles, or a combination thereof.

3. A method of claim 1 further comprising:
migrating a pre-fetching, a caching, or a combination thereof of the one or more digital objects among the one or more architectural layers based, at least in part, on the provisioning, the one or more densities, or a combination thereof.

4. A method of claim 1 further comprising:
determining one or more connectivity types of the one or more connectivity resources used to make the one or more requests; and
determining which of the one or more architectural layers, the one or more computational resources, the one or more storage resources, the one or more connectivity resources, or a combination thereof to provision based, at least in part, on the one or more connectivity types.

5. A method of claim 4, wherein the one or more connectivity types include, at least in part, one or more short range connectivity types, one or more medium range connectivity types, or a combination thereof.

6. A method of claim 5, wherein the one or more short-range connectivity types include, at least in part, one or more radio-frequency memory tags, one or more short-range wireless radio protocols, or a combination thereof; and wherein the one or more medium range connectivity types include, at least in part, one or more cognitive radio protocols.

7. A method of claim 5 further comprising:
determining one or more movements of the one or more clusters over a geographical area based, at least in part, on the one or more connectivity types,
wherein the one or more requests made over the one or more short range connectivity types are indicative of the one or more clusters being stationary; and
wherein the one or more requests made over the one or more medium range connectivity types are indicative of the one or more clusters moving.

8. A method of claim 1 further comprising:
determining the one or more requests based on one or more links (a) among the one or more architectural layers; (b) among one or more clients and the at least one mixed reality application; (c) among the one or more clients and the architectural layers; (d) among the one or more clients and the at least one cloud computing infrastructure; or (e) a combination thereof,
wherein the one or more densities are further based, at least in part, on the one or more links.

9. A method of claim 1 further comprising:
determining one or more end points associated with the one or more requests; and
determining the provisioning substantially separately for the respective one or more end points.

10. A method of claim 9, wherein the one or more end points are based, at least in part, on one or more usage classes associated with the one or more requests.

11. An apparatus comprising:
at least one processor; and
at least one memory including computer program code for one or more programs,
the at least one memory and the computer program code configured to, with the at least one processor, cause the apparatus to perform at least the following,
determine one or more requests for one or more digital objects, wherein the one or more digital objects aggregate location-based data, one or more computations, or a combination for supporting at least one mixed reality application;
determine one or more densities of the one or more requests with respect to one or more geographical boundaries defined by one or more clusters of the one or more digital objects; and
process and/or facilitate a processing of the one or more densities to cause, at least in part, a provisioning of one or more computational resources, one or more storage resources, one or more connectivity resources, or a combination thereof across one or more architectural layers of at least one cloud computing infrastructure for delivering the one or more digital objects, the at least one mixed reality application, or a combination thereof.

12. An apparatus of claim 11, wherein the one or more architectural layers include, at least in part, one or more core content delivery layers, one or more regional content delivery layers, one or more edge content delivery layers, or a combination thereof; and wherein the location-based data include, at least in part, one or more map tiles, one or more augmented reality tiles, or a combination thereof.

13. An apparatus of claim 11, wherein the apparatus is further caused to:
cause, at least in part, a migration, a pre-fetching, a caching, or a combination thereof of the one or more digital objects among the one or more architectural layers based, at least in part, on the provisioning, the one or more densities, or a combination thereof.

14. An apparatus of claim 11, wherein the apparatus is further caused to:

determine one or more connectivity types of the one or more connectivity resources used to make the one or more requests; and
determine which of the one or more architectural layers, the one or more computational resources, the one or more storage resources, the one or more connectivity resources, or a combination thereof to provision based, at least in part, on the one or more connectivity types.

15. An apparatus of claim 14, wherein the one or more connectivity types include, at least in part, one or more short range connectivity types, one or more medium range connectivity types, or a combination thereof.

16. An apparatus of claim 15, wherein the one or more short-range connectivity types include, at least in part, one or more radio-frequency memory tags, one or more short-range wireless radio protocols, or a combination thereof and wherein the one or more medium range connectivity types include, at least in part, one or more cognitive radio protocols.

17. An apparatus of claim 15, wherein the apparatus is further caused to:
determine one or more movements of the one or more clusters over a geographical area based, at least in part, on the one or more connectivity types,
wherein the one or more requests made over the one or more short range connectivity types are indicative of the one or more clusters being stationary; and
wherein the one or more requests made over the one or more medium range connectivity types are indicative of the one or more clusters moving.

18. An apparatus of claim 11, wherein the apparatus is further caused to:
determine the one or more requests based on one or more links (a) among the one or more architectural layers; (b) among one or more clients and the at least one mixed reality application; (c) among the one or more clients and the architectural layers; (d) among the one or more clients and the at least one cloud computing infrastructure; or (e) a combination thereof,
wherein the one or more densities are further based, at least in part, on the one or more links.

19. An apparatus of claim 11, wherein the apparatus is further caused to:
determine one or more end points associated with the one or more requests; and
determine the provisioning substantially separately for the respective one or more end points.

20. An apparatus of claim 19, wherein the one or more end points are based, at least in part, on one or more usage classes associated with the one or more requests.

* * * * *